United States Patent
Kleinbach et al.

(10) Patent No.: US 9,878,383 B2
(45) Date of Patent: Jan. 30, 2018

(54) METHOD FOR MACHINING TOOTH EDGES AND MACHINING STATION DESIGNED FOR THIS PURPOSE

(71) Applicant: GLEASON-PFAUTER MASCHINENFABRIK GMBH, Ludwigsburg (DE)

(72) Inventors: Kurt Kleinbach, Beilstein (DE); Juergen Kreschel, Hemmingen (DE); Matthias Philippin, Rutesheim (DE); Edgar Weppelmann, Asperg (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 43 days.

(21) Appl. No.: 14/907,576

(22) PCT Filed: Jul. 15, 2014

(86) PCT No.: PCT/EP2014/001930
§ 371 (c)(1),
(2) Date: Jan. 26, 2016

(87) PCT Pub. No.: WO2015/014448
PCT Pub. Date: Feb. 5, 2015

(65) Prior Publication Data
US 2016/0158861 A1  Jun. 9, 2016

(30) Foreign Application Priority Data
Jul. 31, 2013  (DE) .................. 10 2013 012 797

(51) Int. Cl.
*B23F 19/10*  (2006.01)
*B23F 21/00*  (2006.01)
(Continued)

(52) U.S. Cl.
CPC ............ *B23F 19/102* (2013.01); *B23F 5/163* (2013.01); *B23F 5/20* (2013.01); *B23F 19/10* (2013.01);
(Continued)

(58) Field of Classification Search
CPC .......... B23F 19/02; B23F 19/04; B23F 19/10; B23F 19/101; B23F 5/163; B23F 5/20; Y10T 409/101113; Y10T 409/101272
See application file for complete search history.

(56) References Cited

U.S. PATENT DOCUMENTS 1,966,172 A * 7/1934 Jackowski ............. B23F 19/04
451/114
2,165,386 A * 7/1939 Klomp .................... B23F 19/04
29/90.6
(Continued)

FOREIGN PATENT DOCUMENTS

DE  2157619 B1  10/1972
DE  4122460 C1 *  4/1992  ............. B23F 5/163
(Continued)

OTHER PUBLICATIONS

EPO machine translation of FR 1447376, printed Apr. 2017.*
(Continued)

*Primary Examiner* — Daniel Howell
(74) *Attorney, Agent, or Firm* — Robert L. McDowell

(57) ABSTRACT

The invention concerns a method for the machining of the tooth edges between an axially facing surface and the tooth flanks of a gear with a machining tool that has a toothed contour. For the material-removing cutting operation, the machining tool, rotating about the axis of its toothed contour, is brought into rolling engagement with the toothed
(Continued)

Figure 1:
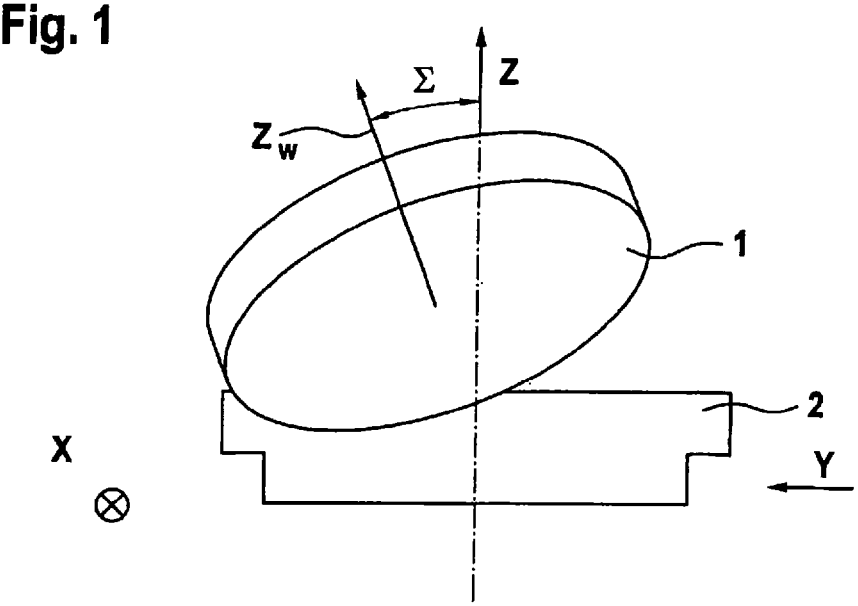

workpiece under a crossing angle different from zero between the rotary axes of the machining tool and the toothed workpiece.

21 Claims, 3 Drawing Sheets

(51) Int. Cl.
    *B23F 5/16*      (2006.01)
    *B23F 5/20*      (2006.01)

(52) U.S. Cl.
    CPC ..... *B23F 21/00* (2013.01); *Y10T 409/101113* (2015.01)

(56) References Cited

U.S. PATENT DOCUMENTS

| | | | |
|---|---|---|---|
| 2,295,148 A | | 9/1942 | Witham |
| 2,683,399 A | | 7/1954 | Dodge |
| 3,399,599 A | * | 9/1968 | Looman ................. B23F 5/163 409/34 |
| 3,570,367 A | * | 3/1971 | Looman ................. B23F 5/163 409/34 |
| 4,066,001 A | * | 1/1978 | Nishijima ............... B23F 5/163 407/28 |
| 9,120,165 B2 | * | 9/2015 | Marx ..................... B23F 5/163 |
| 9,327,358 B2 | * | 5/2016 | Nakahara ................ B23F 5/20 |
| 9,381,586 B2 | * | 7/2016 | Heinemann ............. B23F 5/163 |
| 9,415,454 B2 | * | 8/2016 | Schweiker ............. B23F 5/163 |
| 2014/0105698 A1 | * | 4/2014 | Vogel ..................... B23F 5/163 409/36 |

FOREIGN PATENT DOCUMENTS

| | | | | |
|---|---|---|---|---|
| EP | 2537615 A1 | | 12/2012 | |
| FR | 1447376 A | * | 7/1966 | ............. B23F 5/163 |
| GB | 365352 A | * | 1/1932 | ............ B23F 19/025 |
| GB | 474505 A | * | 11/1937 | ............... B23F 5/20 |
| GB | 818135 A | | 8/1959 | |
| JP | S61-8221 A | | 1/1986 | |
| WO | WO 2017102824 A1 | * | 6/2017 | ............. B23F 5/163 |

OTHER PUBLICATIONS

EPO—Patent Abstracts of Japan, JP 61-008221 published Jan. 14, 1986, Mitsubishi Heavy Industries, Copyright 1986, JPO & Japio, 1 pg.

International Search Report and Written Opinion for PCT/EP2014/001930, ISA/EPO, Feb. 27, 2015, 13 pgs. with English translation (12 pgs.).

* cited by examiner

METHOD FOR MACHINING TOOTH EDGES AND MACHINING STATION DESIGNED FOR THIS PURPOSE

The invention concerns a method for the machining of the tooth edges between an axially facing surface and the tooth flanks of a gear, as well as a machining station designed to perform the method, and a gear-cutting machine that is equipped with said machining station.

Methods of this kind belong to the known state of the art as disclosed for example in DE 10 2009 019 433 A1. The machining operation on the tooth edges is performed because the chip-cutting process by which gears are produced raises a burr along the tooth edges bordering the axially facing surface. There are several reasons why this burr needs to be removed. For example, as the axially facing end surface of the gear is to serve as a planar clamping- or reference surface, its planarity would be compromised by the burr. Furthermore, there is a risk that, after the workpiece has been hardened, the burr may break off later when the gear is running in a transmission, whereby the tooth flanks or parts of the transmission may be damaged. Besides, a burr of this kind can also cause injuries to persons handling the gears or toothed workpieces. If one were to merely remove the burr without working on the tooth edge itself, there is a risk that in the hardening treatment the tooth edge may become glass-hard as a result of carburization and break away under stress.

Several methods have been developed in the technical field in order to obviate these drawbacks. Such a method, which is disclosed for example in EP 1 279 127 A1, concerns the plastic reshaping of the tooth edge into a chamfer, wherein the material of the workpiece in the area of the tooth edge is pushed back by a chamfering wheel in rolling tooth engagement with the workpiece. However, the secondary burrs which are generated in this process will also have to be removed afterwards as they present a problem in a subsequent hard-finishing process such as honing or grinding, where the burrs could cause premature wear of the respective hard-finishing tools. A method whereby such secondary burrs can be removed is taught in DE 10 2009 018 405 A1.

As an alternative to producing a chamfer through plastic deformation under contact pressure, it is possible to generate a chamfer at the tooth edge through a cutting process. According to DE 10 2009 019 433, a substantially cylindrical tool with at least one cutting edge is clamped to a tool spindle. After a radial infeed movement has brought this chamfering tool into machining engagement with an end surface of the toothed workpiece, a chamfer is generated on the edges of the gear teeth. With the design configuration disclosed in DE 10 2009 019 433, the cutting movement of the chamfering tool on both end surfaces can always be directed towards the center of the gear profile. The subject of the invention is a treatment of the tooth edges wherein a chamfer on the tooth edge is produced through a cutting operation.

The present invention has the objective to improve a method of the same generic kind as described above with the aim of providing more flexibility also in regard to the shape of the toothed workpieces that are to be machined.

From a method-oriented point of view, the invention solves this task through a more advanced version of the method named hereinabove, which is in essence characterized by the feature that the machining tool has a toothed contour and that, for the material-removing cutting operation the machining tool, rotating about the axis of its toothed contour, is brought into rolling engagement with the toothed workpiece that is to be machined, with the rotary axes of the machining tool and the toothed workpiece in process being positioned relative to each other at an axis-crossing angle different from zero.

Accordingly, compared to the state of the art described above, the invention is based on a completely different kinematic arrangement of the participating machine axes, as the machining tool has a toothed contour, and the axis of the toothed tool contour is inclined at an axis-crossing angle relative to the gear axis of the toothed workpiece whose tooth edges are being machined. Kinematically, this is analogous to a crossed helical gear transmission, which is characterized by a skewed position of the participating rotary axes in relation to each other. To arrive at the axis-crossing angle, normally labeled as $\Sigma$, one would start from a parallel state of the rotary axes and then swivel one of the rotary axes about a connecting line between the respective centers of the toothed workpiece and the tool (a connecting line perpendicular to both rotary axes). Besides, those skilled in the art will in any event be familiar with the significance of the axis-crossing angle, for example in the context of power-skiving. A graphic description of machine axes, kinematics and cutting conditions as well as definitions of terms are found for example in EP 2 537 615 A1.

Thus, by skewing the axes relative to each other at a crossing angle, a cutting mechanism is produced in which the cutting velocity depends on the crossing angle between the axes as well as on the rate of rotation of the machining tool. The cutting edges of the tool are formed by the tooth edges of the tool.

Accordingly, as a result of the axes crossing each other at an angle different from zero, the cutting direction of the cutting movement can have a directional component moving in the direction of the tooth width along the tooth flank adjoining the machined tooth edge.

Figure 2:
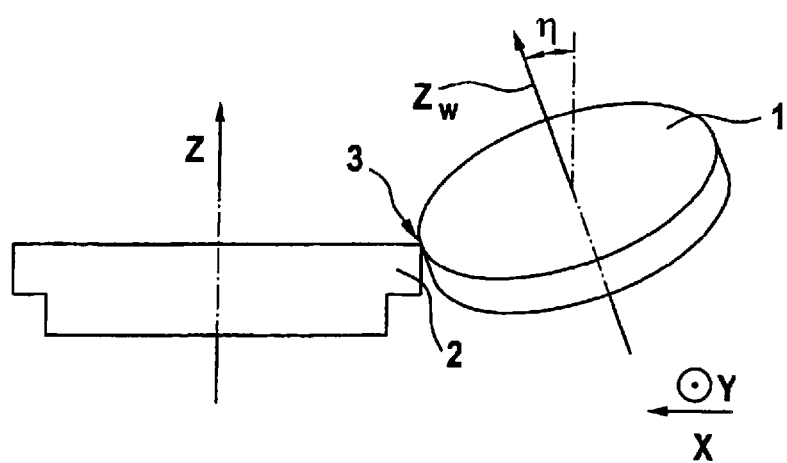

In order to add to the cutting direction of the cutting movement a directional component orthogonal to the direction of the tooth flank, a particularly preferred procedure is to set the rotary axis of the tool at an angle of inclination different from zero relative to a plane that extends orthogonal to the connecting line between the center of the toothed workpiece and the center of the tool. Accordingly, the tool is tilted in the direction towards the workpiece axis Z (FIG. 2). This is a particularly simple way of achieving a profile-shaping contact line that leads over the tooth edge. The angle of inclination also corresponds to an inclination of the plane of the tool relative to the plane of contact.

The thereby determined mutual position of the axes for the machining engagement can thus be set—starting from a parallel position of the axes—through rotations about two linearly independent rotary axes. Alternatively, a crossing angle of the axes can also be set by performing a rotation about only one axis and adding a linear displacement with a displacement component perpendicular to the connecting line of the centers (the line that is orthogonal to both axes) and to one of the rotary axes of the toothed workpiece and the machining tool. A displacement of this kind is characterized by a non-zero offset between the crossing point (seen in projection) of the axes and the point of engagement (contact point) of the machining operation. Following this displacement, the originally set crossing angle between the axes can be considered as a composite of an effective crossing angle and the angle of inclination.

Furthermore, the direction of the connection between the centers is a radial direction, which could also be used as the direction of the infeed axis in the inventive method, for a pure infeed or for a plunge cutting feed.

In preferred embodiments, the crossing angle of the axes is at least 4°, further with preference at least 8°, in particular at least 12°. On the other hand, the crossing angle should not exceed a reasonable limit of 45° and should preferably be no larger than 35°, in particular no larger than 25°. This allows for sufficiently fast cutting velocities while simultaneously not imposing excessive demands on the design of the machining tool.

In regard to the angle of inclination, the preferred amount of inclination is at least 8 percent, preferably at least 16 percent, in particular at least 24 percent. On the other hand, the inclination should not exceed 80 percent and preferably be no larger than 60 percent, in particular no larger than 40 percent. This setting of the inclination, particularly in combination with the setting of the crossing angle specified above, ensures that the profile-shaping contact lines follow a suitable path.

As discussed above, the rate of rotation of the machining tool about its rotary axis is one of the factors that determine the cutting velocity. With the settings for the axes of the other movements having been made, the rate of rotation of the machining tool is preferably set to a value at which the cutting velocity is at least 10 m/min, preferably at least 30 m/min, in particular at least 50 m/min. As an upper limit, a cutting velocity no larger than 450 m/min, preferably no larger than 300 m/min, in particular no larger than 200 m/min, but not excluding 150 m/min, is envisioned. This allows for a reasonable compromise between economy of machining time and a sufficient operating life span of the tool.

To ensure that the tooth flanks are in any case undergoing a complete machining treatment between the dedendum flank and the addendum flank, the profile-shaping contact lines need to be pushed over the entire tooth edge area of a tooth gap. According to the invention, there are principally several ways in which this can be accomplished.

As a first possibility, the tool and the toothed workpiece can be subjected to a movement relative to each other which has a directional component parallel to the axis of the toothed contour of the workpiece. This can be a movement along the axis of the toothed contour or along the tool axis, similar to the process of power-skiving. It is particularly advantageous to use this version if the angle of inclination is large.

Conceivably, in this case, some tooth edges of the toothed workpiece, in any case some areas of the tooth edges, may not even come into contact with some areas of the cutting edges that are arranged for example at the tooth edges of the toothed contour of the machining tool.

On the other hand, the toothed contour of the machining tool does not need to extend along the full perimeter, even though this represents the preferred configuration. In principle, a single tooth carrying a cutting edge would be sufficient. In this case, an appropriately small axial infeed velocity would have to be selected.

Alternatively, a structure that produces this effect could also be incorporated in the machining tool itself. Details of this concept will be described below in the context of the device claims.

With this latter possibility, it may in some cases be feasible to completely do away with an infeed movement that would be directed for example parallel to the axis of the toothed workpiece or to the tool axis. This is particularly advantageous if the workpiece carrying the toothed contour also has near the latter a shoulder which needs to be kept safe from being damaged in the process of finishing the tooth edges. In this case, several different teeth of the tool enter into engagement with each gap, machining the two tooth edges of each gap in segments in a rolling sequence.

From a device-oriented point of view, the invention provides a machining station for the finishing of the tooth edges between each of the axially facing end surfaces and the tooth flanks of a toothed workpiece, which is in essence distinguished by the feature that a crossing angle different from zero can be set between the tool spindle axis and the workpiece spindle axis, and that a controller device is provided which controls the rotary movements of the spindles for a rolling engagement between the toothed workpiece and a toothed contour of the tool at an axis-crossing angle different from zero.

The advantages of this machining station follow from the advantages of the inventive method. Accordingly, the machining station in a preferred embodiment can have a linear movement axis for the infeed, in particular a first machine axis, with a directional component radial to the workpiece spindle axis. Appropriately, the machining station also has a machine axis allowing a relative movement between the workpiece spindle and the tool spindle with a directional component parallel to the workpiece spindle axis. This makes it on the one hand possible to realize an axial infeed movement. As another favorable aspect, it allows the axial position of the machining tool to be changed, which is particularly advantageous in the machining of workpieces of varying tooth width. Besides, this feature can also be used to change the axial position of the tool relative to the workpiece between the machining of the tooth edges at one axially facing end surface and at the opposite end surface. As a further preferred feature, an angle of inclination different from zero can be set for the tool spindle axis relative to a plane that extends orthogonal to the connecting line between the center of the toothed workpiece contour and the center of the tool.

In a conceivable embodiment, a further rotary machine axis is envisioned which comprises a directional component orthogonal to the axis that serves to set the crossing angle of the axes and orthogonal to the workpiece spindle axis. Consequently, the crossing angle of the axes and the angle of inclination are set by way of two rotary machine axes.

Another, and more preferred, embodiment however has a second machine axis with a directional component lying in a plane that extends orthogonal to the workpiece spindle axis, wherein said directional component is linearly independent of a projection of the first machine axis onto said plane. In a practical configuration, this can be a cross-slide stage for the radial infeed direction X and in addition for the direction Y that runs orthogonal to the workpiece spindle axis. As a result of the displacement of the slide stage in the Y-direction, a crossing angle of the axes that was originally set by way of a rotation about the radial axis X receives an inclination component $\eta$, as the orientation of the tool spindle axis does not change during the displacement, while the connector axis between the respective centers of the workpiece and the tool does change.

In regard to the shape of the tool, the latter can preferably be disk-shaped, specifically with an axial dimension no larger than 10 cm, preferably no larger than 7 cm, and in particular no larger than 4 cm. Appropriately, the toothed contour of the tool has a step-ground finish and thus has a basic shape that is also favored in power-skiving.

Furthermore, the machining tool can be designed with a structure that produces the effect of an infeed movement parallel to the tool axis. This is preferably accomplished through a design where the tool has areas with varying heights of the rake faces on its teeth. As the teeth carry the rake faces with the cutting edges, the invention thus also discloses, as a concept that is in itself deserving of protection, a machining tool for the finishing of the tooth edges between each end surface and the tooth flanks by removing material from the tooth edges in a cutting operation, wherein the rake faces adjoining the cutting edges of the machining tool have varying heights measured in the direction of the rotary axis of the tool.

The foregoing concept is realized in a special embodiment of the machining tool, wherein the rake faces of the tool at least in part rise in the form of a spiral. The basic shape of the rake faces can in addition be formed by step-grinding.

In addition to the positions of the rotary axes of the tool and the toothed workpiece relative to each other, the height gained in one turn as a result of the helical pitch is in this case a determinant factor for the length of the edge segment swept by the profiles-shaping contact lines in the absence of an additional infeed movement.

The invention further provides a gear-cutting machine for the machining of toothed workpieces with a machining station according to the foregoing description. This gear-cutting machine can in particular be equipped with a further operating station which serves to generate the teeth on the workpiece through a soft-cutting process, for example hobbing, gear shaping, or power-skiving. Furthermore, the protection for the method according to the invention also extends to a controller program in which the method is implemented.

The method according to the invention can be used for the machining of the tooth edges of internal as well as external gears.

Figure 4:
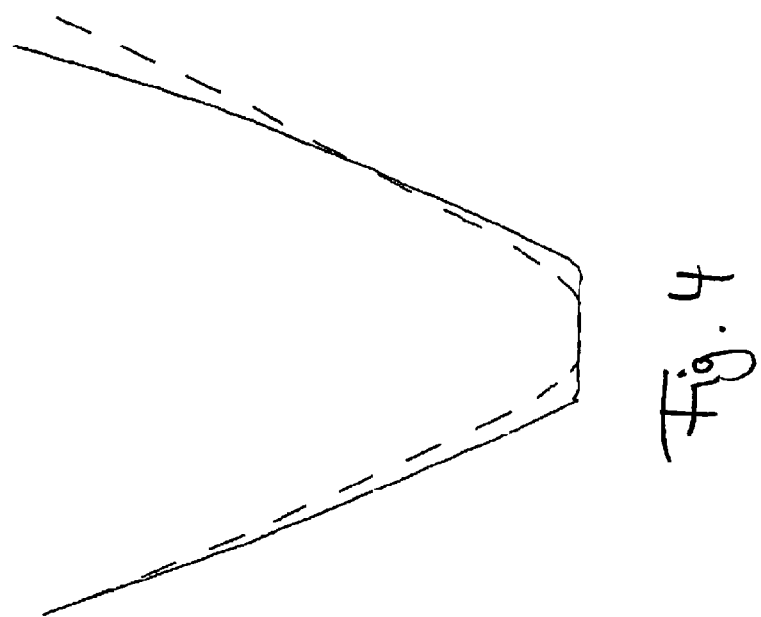
Figure 3A:
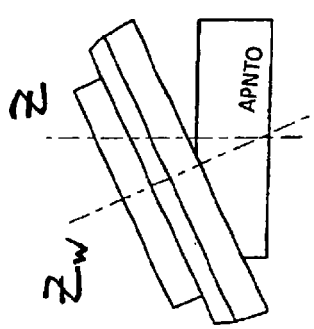
Figure 3B:
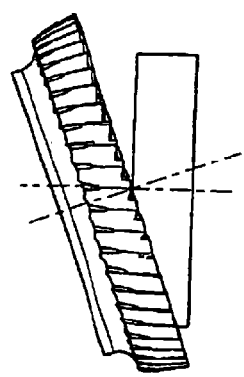
Figure 5:
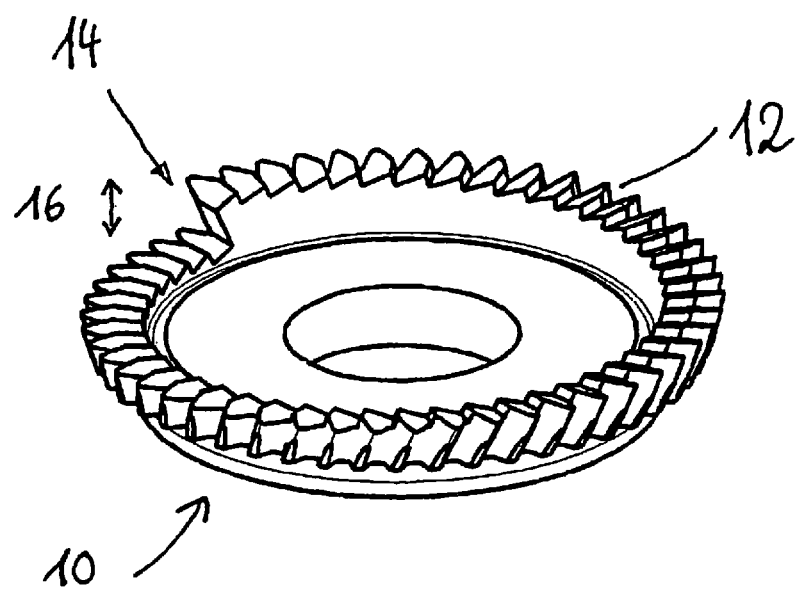

Further distinguishing features, details and advantages of the invention will become evident from the following description which refers to the attached drawings, wherein FIG. 1 schematically illustrates the geometry of the engagement between the tool and the gear profile to be machined, seen in a first viewing direction;

FIG. 2 schematically illustrates the same machining engagement as shown in FIG. 1, seen in a second viewing direction;

FIG. 3a illustrates a position of the axes used in the machining of the tooth edges;

FIG. 3b for comparison to FIG. 3a, illustrates the positions of the axes used in power-skiving;

FIG. 4 shows the profile of a tool for the machining of tooth edges in comparison to a profile of a tool that generates the underlying gear contour by means of power-skiving; and FIG. 5 shows a special form of a tool for the machining of tooth edges.

FIG. 1 illustrates the underlying kinematics of the machine axes on which the inventive method is based. A workpiece with a toothed contour 2 is shown in FIG. 1 with its gear axis Z oriented vertically, but the individual teeth of the toothed contour 2 are not outlined in the schematic representation of FIG. 1. In its projected image in the drawing plane of FIG. 1 which extends orthogonal to the radial infeed direction X, the gear axis Z of the gear profile 2 encloses an axis-crossing angle Σ with the rotary axis $Z_W$ of a tool 1. In the illustrated example, Σ is 20°. The axes X, Z and Y in this example form a rectangular coordinate system.

FIG. 2 further illustrates the engagement between tool and workpiece as seen in the Y-direction Y, i.e. in a viewing direction that is turned by 90° in relation to the viewing direction of FIG. 1. As is evident from FIG. 2, the tool 1 is also inclined against a plane that extends orthogonal to the X-direction, specifically by an angle η which is in this case 30°. FIG. 2 illustrates the machining of the tooth edges that lie between the tooth flanks of the toothed contour 2 and the axially facing end surface 3 at the top. For the machining of the edges at the bottom side, the workpiece can be turned over, so that the bottom surface in FIG. 3 becomes the top surface, while the position of the tool remains the same as for the operating situation shown in FIG. 2. Alternatively, the same relative mutual positioning between the workpiece and the tool can also be accomplished by changing the position of the tool. This capability can in particular be realized through a design where the tool can be swiveled by 180° or more about the axis designated as X in FIG. 2.

In principle, the cutting can be directed from the inside out (out of the gap) or the opposite way (into the gap). To change from one kind of cutting to the other, the sense of rotation needs to be reversed accordingly.

As explained above, the machine does not require a second rotary axis to allow a desired position of the axis to be set. Instead, starting from the position shown in FIG. 3b which is used for power-skiving and where the location of the cutting engagement in the projected view of the drawing lies in the area of the projected crossing of the axes, the tool can be subjected to a shift movement (directed to the left in FIG. 3). In this shift movement, the orientation of the tool axis does not change, but the center of the tool is shifted. The plane that extends orthogonal to the connecting line between centers, which coincides with the drawing plane in FIG. 3b, is thus tilted out of the drawing plane—figuratively speaking—so as to be again perpendicular to the new connecting line in FIG. 3a. The rotary axis of the tool in FIG. 3a lies no longer in this plane, but is inclined at an angle from the latter in the direction towards the rotary axis of the workpiece.

In FIG. 3a, the outlines of the individual teeth shown in FIG. 3b have been omitted. This is meant to indicate that the profile of the tool for the machining of the tooth edges does not match the tooth profile of the power-skiving tool shown in FIG. 3b. Rather, the tool profile of the tooth-edge-machining tool is modified for this purpose, since for the generation of the chamfer the edge has to be broken in the plane of the axially facing surface and, accordingly, the velocity vector has to be parallel to the chamfer of the surface. An example for this modification is shown in FIG. 4, wherein the solid line represents the tooth profile of the tool used for the power-skiving, while the broken line represents the corresponding profile of the chamfering tool.

Using the tool 10 shown in FIG. 5 eliminates the need for moving the tool in its axial direction during the machining of the tooth edges on an axially facing surface. The toothed contour 12 of the tool 10 winds about the rotary axis $Z_W$ in the form of a continuously rising spiral and therefore has a discontinuity 16 at a location 14. A single complete rotation of the tool 10 about its rotary axis causes the profile-forming contact lines to be pushed fully over both tooth edges of a tooth gap of the gear profile to be machined, whereby a particularly time-saving way of machining the tooth edges is achieved. The continuous spiral shape is preferred but not required. Configurations with a plurality of segments interrupted by steps are also possible.

In principle, unlike the chamfering of gear tooth edges through plastic deformation, the generation of a chamfer on the tooth edges through a cutting operation does not require a second step to follow. This shortens the machining time for the workpieces.

To further clarify the invention, the primary purpose of the following discussion is to allow the reader to visualize the cutting process on which the inventive method is based.

To start, in a simplified view a line element dl of a cutting edge of the tool is considered which lies on a tooth edge of the gear-toothed contour of the machining tool, i.e. in a plane that extends orthogonal to the rotary axis $Z_W$ of the tool. In a snapshot, the directional vector of the cutting edge element dl can be described for example as (cos θ, sin θ, 0), wherein θ stands for the angle at which the cutting edge element is inclined relative to a radial axis, in the snapshot for example relative to the axis $X_W$ of the reference system of rest ($X_W$, $Y_W$, $Z_W$) of the machining tool.

A movement along the orientation vector of the cutting edge itself in relation to a non-moving workpiece does not cause any cutting action, and the cutting edge element dl always moves in the plane that extends orthogonal to the rotary axis $Z_W$. For the purposes of the following explanation, a cutting direction (in an absolute reference system) is therefore assumed which lies in this plane and is directed orthogonal to the cutting edge element dl. Accordingly, this cutting direction can be defined by a directional vector $s_W$=(− sin θ, cos θ, 0) in relation to the reference frame of rest of the machining tool.

Considering at first only the crossing angle Σ that has been set between the rotary axes, this represents the equivalent of tilting the tool about the infeed axis X, so that the cutting direction, excluding the inclination η but including the axis-crossing angle Σ, can be represented in the spatially fixed coordinate system (X, Y, Z) as $s_Σ$=(− sin θ, cos θ cos Σ, cos θ sin Σ).

The third of the vector components of this cutting direction also illustrates how the component parallel to the gear axis depends on the axis-crossing angle.

The configuration of the axis-crossing angle Σ without the additional angle of inclination η represents the basic constellation for the machine axes that is used in power-skiving, wherein in view of the shape of the tooth flank surfaces already completed by power-skiving with maximum radial infeed, the cutting direction in the relative movement against the likewise rotating gear in process cannot have a component orthogonal to the tooth flank. If this requirement is applied to a snapshot in the sense that in a coordinate system rotated about the gear axis Z, the first component of the cutting direction represents the (vanishing) component orthogonal to the (in this case spatially fixed) component and the second component along the tooth flank represents the direction of the tooth height, a rotation by an angle χ is required so that the first component of $s_Σ$ vanishes, i.e. a rotation for which the condition $\tan χ = \tan θ/\cos Σ$ is met.

However, in the preferred embodiment of the invention, the rotary axis $Z_W$ is additionally tilted in the spatially fixed system about the axis Y, specifically by the tilt angle η. In the spatially fixed system (X, Y, Z), the vector of the (absolute) cutting direction thus takes on the form $$s_{Σ,η}=(\cos θ \sin Σ \sin η − \sin θ \cos η, \cos θ \cos Σ, \cos θ \sin Σ \cos η + \sin θ \sin η).$$

Changing to a coordinate system that is rotated by the angle χ where the cutting direction takes on the form $s_{Σ,η,χ}=(s_⊥, s_∥, s_Z)$, one arrives at the following expression for the component perpendicular to the tooth flank $$s_⊥=(\sin Σ \sin η \cos θ − \cos η \sin θ)×\cos χ + \cos Σ \cos θ \sin χ.$$

Thus, the cutting direction has a non-vanishing component $s_⊥$, which has the consequence that in the cutting action the profile lines are pushed over the tooth edge. Inserting the value θ=0 for the sake of transparency, the result for $s_⊥$ is reduced to $$s_{⊥}|_{θ=0}=\sin Σ \sin η.$$

Interpreting this result graphically, the non-vanishing axis-crossing angle Σ makes it possible to realize a cutting direction with a vector component perpendicular to the tooth flank which in the preferred embodiment also includes the sine of the additional angle of inclination. Consequently, in this preferred embodiment, the vector component of the cutting direction that is directed perpendicular to the tooth flank of the gear tooth profile in process is predominantly dependent on the factor $\sin Σ × \sin η$.

Furthermore, the invention is not limited to the examples of embodiments presented in the description of the drawings. Rather, the features of the following claims and of the foregoing description can be essential, individually or in combination, for the realization of the invention in its different embodiments.

The invention claimed is:

1. Method for the machining of the tooth edges between an axially facing surface (3) and the tooth flanks of a toothed workpiece (2) to produce a chamfer wherein a tool (1) with a cutting edge removes material from the tooth edges of the toothed workpiece (2) through a cutting action as the toothed workpiece (2) rotates about its workpiece gear axis (Z),
characterized in that the machining tool has a toothed contour comprising teeth and cutting edges arranged facing axially on said tool and that, for the material-removing cutting operation the machining tool, rotating about the axis (ZW) of its toothed contour, is brought into rolling engagement with the toothed workpiece (2) that is to be machined, with the rotary axes of the toothed workpiece and the machining tool (Z, ZW) in process being positioned relative to each other at an axis-crossing angle (Σ) different from zero.

2. Method according to claim 1, wherein as a result of the axis-crossing angle, the cutting direction(s) of the cutting movement has a directional component which along the tooth flank adjoining the machined tooth edge runs in the direction of the tooth width.

3. Method according to claim 1 wherein the tool and workpiece are positioned relative to one another at an angle of inclination (η) different from zero and which is the angle of the rotary axis of the tool relative to a plane extending orthogonal to the connecting line between the center of the workpiece gear profile and the center of the tool, the cutting direction(s) of the cutting movement has a directional component which runs orthogonal to the tooth flank.

4. Method according to claim 1 wherein the axis-crossing angle (Σ) is at least 4° and/or the axis-crossing angle is no larger than 45°.

5. Method according to claim 3 wherein the angle of inclination (η) is at least 8° and/or the angle of inclination is no larger than 80°.

6. Method according to claim 1 wherein the cutting velocity is at least 10 m/min and/or the cutting velocity is no larger than 450 m/min.

7. Method according to claim 1 wherein the tool (1) and the toothed workpiece (2) are subjected to a movement relative to each other which has a directional component parallel to the gear axis (Z) of the workpiece in process and serves to completely finish the tooth edges.

8. Method according to claim 1 wherein the tool is designed with a structure whereby a single rotation of the tool results in the complete finishing of the tooth edges.

9. Method according to claim 1 wherein during the machining of the tooth edges at an axially facing end surface the tool and the toothed workpiece are not subjected to a relative movement with a directional component parallel to the gear axis of the workpiece in process.

10. Machining station for the chamfering of the tooth edges between each of the axially facing end surfaces (3) and the tooth flanks of a toothed workpiece (2), comprising
a driven, rotating workpiece spindle serving to hold a workpiece with the toothed contour to be machined,
a driven, rotating tool spindle serving to hold a tool,
characterized in that an axis-crossing angle ($\Sigma$) different from zero can be set between the tool spindle axis and the workpiece spindle axis (Z), and that a controller device is provided which controls the rotary movements of the spindles for a rolling engagement between the toothed workpiece (2) that is to be chamfered and a toothed contour of the tool (1) at an axis-crossing angle $\Sigma$ different from zero according to a method as defined in claim 1.

11. Machining station according to claim 10, with a linear movement axis comprising a first machine axis (X) with a directional component radial to the workpiece spindle axis extending in the radial direction of the workpiece spindle axis.

12. Machining station according to claim 10 wherein a machine axis effecting a relative movement with a directional component parallel to the workpiece spindle axis between the workpiece spindle and the tool spindle is provided.

13. Machining station according to claim 10 wherein an angle of inclination ($\eta$) different from zero can be set between the tool spindle axis and a plane that extends orthogonal to the connecting line between the center of the toothed contour and the center of the tool.

14. Machining station according to claim 10 wherein a further rotary machine axis is provided which comprises a directional component orthogonal to the rotary axis serving to set the axis-crossing angle ($\Sigma$) as well as to the workpiece spindle axis.

15. Machining station according to claim 10 wherein a second linear machine axis is provided which comprises a directional component lying in a plane that extends orthogonal to the workpiece spindle axis, wherein said directional component is linearly independent of a projection of the first machine axis onto said plane.

16. Machining station according to claim 10 wherein the tool is disk-shaped.

17. Machining station according to claim 10 wherein the tool has a step-ground contour.

18. Machining station according to claim 10 wherein the tool (10) is configured with a structure whereby a single rotation of the tool results in the complete finishing of the tooth edges at one axially facing end surface.

19. Machining station according to claim 10 wherein the tool (10) has areas with varying heights of its rake faces measured in the direction of the rotary axis (ZW) of the tool.

20. Machining station according to claim 19 wherein the rake faces of the tool (10) at least in part rise in the form of a spiral.

21. Gear-cutting machine for the machining of toothed workpieces, with a machining station according to claim 10, said gear cutting machine having a further machining station to generate the gear teeth on the workpiece by a soft-cutting process comprising hobbing, gear shaping, or power-skiving.

* * * * *